United States Patent [19]

Chen et al.

[11] Patent Number: 5,268,857
[45] Date of Patent: Dec. 7, 1993

[54] DEVICE AND METHOD FOR APPROXIMATING THE SQUARE ROOT OF A NUMBER

[75] Inventors: Dao-Long Chen; Robert D. Waldron, both of Fort Collins, Colo.

[73] Assignee: NCR Corporation, Dayton, Ohio

[21] Appl. No.: 818,302

[22] Filed: Jan. 8, 1992

[51] Int. Cl.[5] ............................................. G06F 7/552
[52] U.S. Cl. ................................................ 364/752
[58] Field of Search ...................................... 364/752

[56] References Cited

U.S. PATENT DOCUMENTS

| | | | |
|---|---|---|---|
| 4,477,879 | 10/1984 | Wong | 364/752 |
| 4,757,467 | 7/1988 | Dieterich et al. | 364/752 |
| 4,949,296 | 8/1990 | Malinowski | 364/752 |
| 5,060,182 | 10/1991 | Briggs et al. | 364/752 |

*Primary Examiner*—David H. Malzahn
*Attorney, Agent, or Firm*—Douglas S. Foote

[57] ABSTRACT

A device and method for approximating the square root of a binary number N. The device includes hardware for storing N, and a result register for storing $x_n$, where $x_n$ is a successive approximation of r. The device also includes hardware for iteratively replacing $x_n$ with $x_{n+1}$, starting with n=0, where $x_{n+1}=(Ax_n+N-x_n^2)/A$, and $x_0$ is within a predetermined range. "A" is a multiple of 2 so that an operation involving a product or quotient with "A" is effected by a shift operation.

10 Claims, 5 Drawing Sheets

DEVICE AND METHOD FOR APPROXIMATING THE SQUARE ROOT OF A NUMBER

The present invention relates to electronic devices and methods for making numerical approximations. More particularly, it relates to a device and method for approximating the square root of a binary number.

BACKGROUND OF THE INVENTION

Electronic devices for calculating the square root of a binary number are widely available. Such devices may employ either dedicated hardware, software or microcode. Irrespective of structure employed, most devices tend to use the direct calculational method, the Newton-Raphson iteration method or some variant of the Newton-Raphson method.

The direct method is the binary version of the decimal pencil-and-paper method. The direct method is slow due to the large number of iterations required to obtain the result. For example, the IEEE double precision data format with 53 significant bits requires 53 iterations to complete the calculation. In addition, each iterations requires many machine cycles.

The Newton-Raphson iteration method for the square root of a number N is based on the formula $$x_{n+1} = (x_n + N/x_n)/2, \quad (1)$$

where $x_n$ is the square root of the $n^{th}$ iteration and $x_{n+1}$ is the square root of the $(n+1)^{st}$ iteration. This method has an advantage over the direct method in that a fewer number of iterations are required. However, like the direct method, the Newton-Raphson method requires a relatively large number of machine cycles. This is due to the rather lengthy calculation for the quotient $N/x_n$.

A modified versions of the Newton-Raphson method is based on the formula $$x_{n+1} = x_n(3 - Nx^2)/2 \quad (2)$$

This modified version is much faster because it only requires multiplications and a subtraction and no long division. It should be noted that division by 2 in a binary operation is implemented by a shift operation, and therefore requires much less time than a long division. However, the modified equation converges to the reciprocal of the square root of N, thus requiring one long division at the end of the computation. The modified Newton-Raphson method also requires three (3) multiplication steps for each iteration. Attempts to improve on this method have focused on speeding up the multiplication operation. This is generally expensive because it necessitates additional hardware. Another problem with both the original and modified Newton-Raphson methods is that the number of iterations needed to obtain a stated precision is unknown. This prevents accurate prediction of the calculation time for a given problem.

OBJECTS OF THE INVENTION

It is therefore an object of the present invention to provide a new and improved device and method for approximating the square root of a binary number.

It is another object of the present invention to provide a device and method for approximating the square root of a binary number which requires no long divisions.

It is a further object of the present invention to provide a device and method of successively approximating the square root of a binary number with only one multiplication per iteration.

It is yet another object of the present invention to provide a device and method for successively approximating the square root of a binary number in only three machine cycles per iteration.

It is yet a further object of the present invention to provide a device and method for successively approximating the square root of a binary number with a computational time of only one multiplication and one subtraction step per iteration.

It is still another object of the present invention to provide a device and method for approximating the square root of a binary number with a predictable calculation time for a given accuracy.

SUMMARY OF THE INVENTION

One form of the present invention is a device for approximating the square root r of a binary number N. The device includes means for storing N, a result register for storing $x_n$, where $x_n$ is a successive approximation of r, and means for iteratively replacing $x_n$ with $x_{n+1}$, starting with $n=0$. According to the invention, $x_{n+1} = (Ax_n + N - x_n^2)/A$, where $x_0$ is within a predetermined range and A is a multiple of 2.

Another form of the present invention is a method for approximating the square root r of a number L in a computer, L being a binary number between a and b. The equation $x_{n+1} = (Ax_n + L - x_n^2)/A$ is iteratively solved, starting with $n=0$; where $x_0$ is within a predetermined range, A is a multiple of 2, and $x_{n+1}$ is a successive approximation of r. Numeric operations involving A and another quantity are achieved by shifting bits in such quantity.

DESCRIPTION OF A PREFERRED EMBODIMENT

Figure 1:
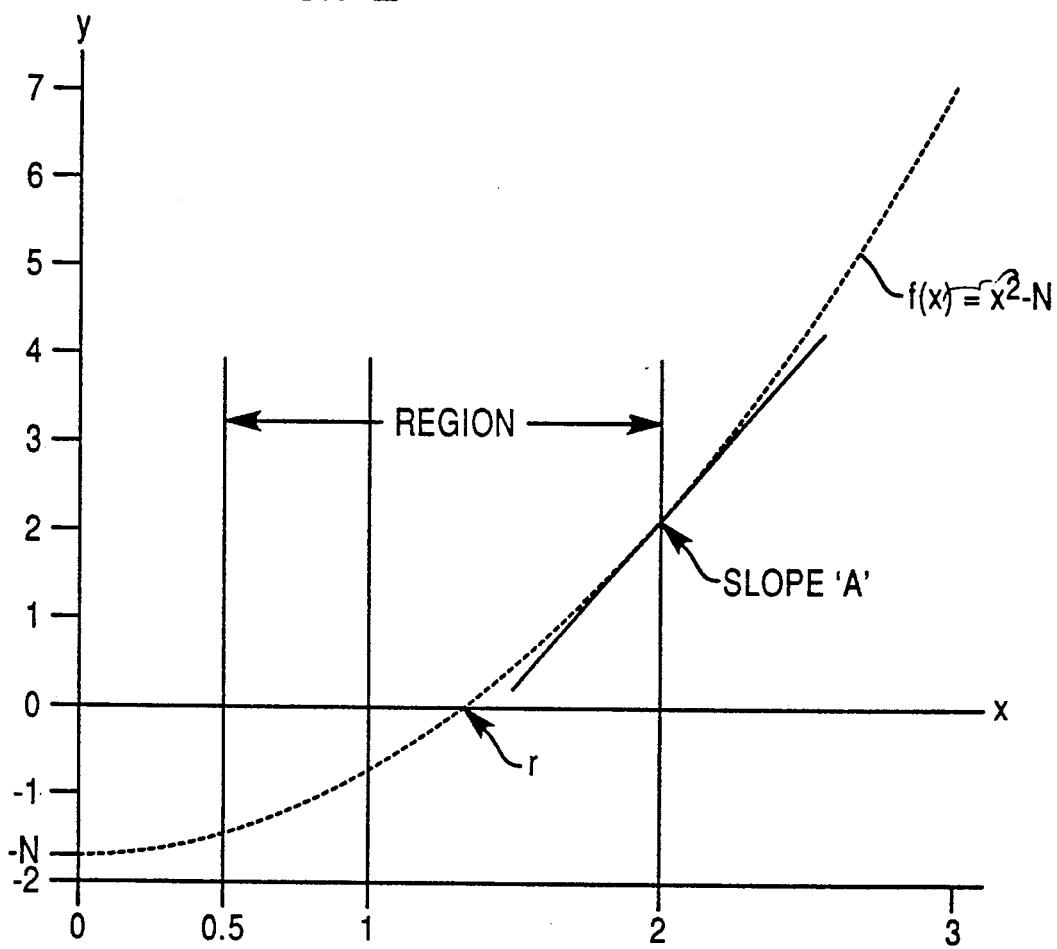
FIG. 1 is a graph of $f(x) = x^2 - N$.

FIG. 1 shows a graph of $f(x) = x^2 - N$ which is a convenient way of visualizing an aspect of the present invention. $f(x)$ will be recognized as a parabola which crosses the y axis at the point $-N$. Of particular interest is the point r at which $f(x)$ crosses the x axis. At point r, $f(r) = 0$, so by substituting in $f(x) = x^2 - N$ $0 = r^2 - N$
$r^2 = N$ and
$r = N^{\frac{1}{2}}$ Therefore, the point r at which $f(x)$ crosses the x-axis is the square root of N.

For purposes of the present description N is selected between 0.5 and 2. More specifically, $0.5 <= N < 2$.

Examining $f(x)$, it can be shown that the greatest value of its slope A occurs at $x = 2$.

$A = f'(x) = 2x$
$A = f'(2) = 4$

Thus, the value of the slope at $x = 2$ is 4

Figure 2:
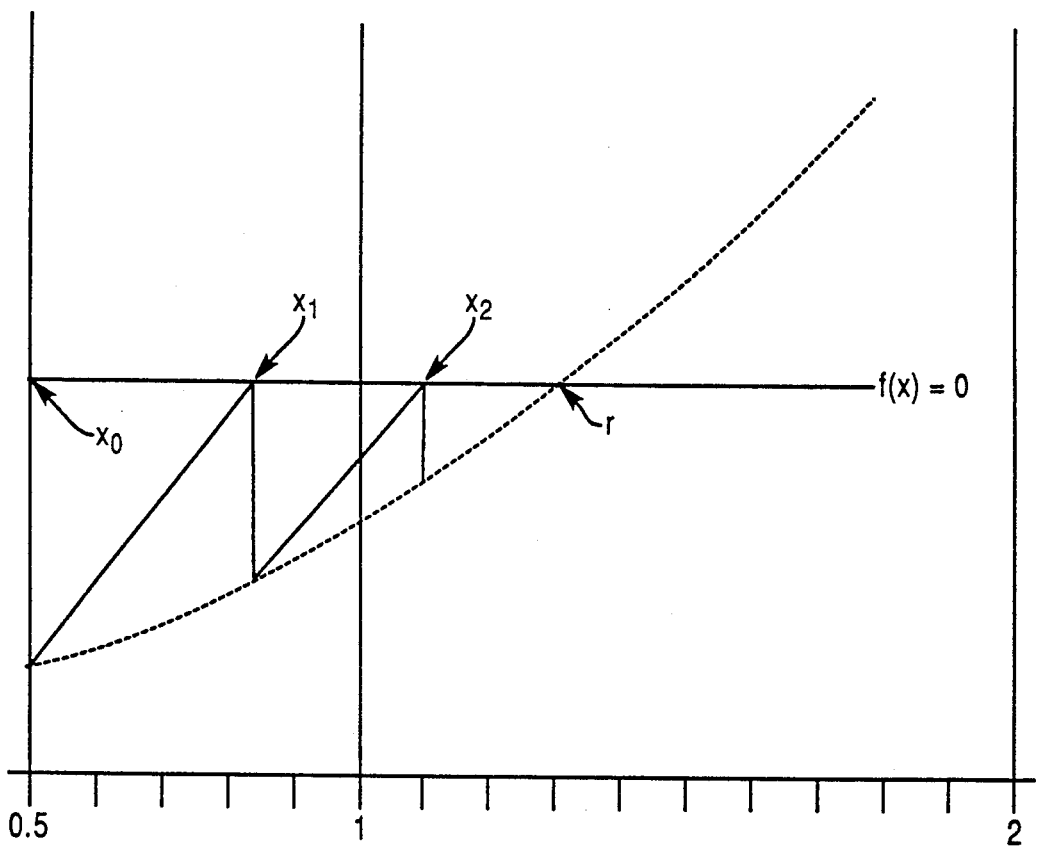
FIG. 2 is an enlarged view of a portion of the graph of FIG. 1.

FIG. 2 shows more detail of the region of the curve f(x) between 0.5 and 2. A first point $x_0$ is selected to serve as a first approximation of r. For example, $x_0$ may be selected so that $0.5 <= x_0 <= 2$, but preferably $x_0 = 0.5$.

A second approximation of r is obtained by constructing a line with a slope of A, from $(x_0, f(x_0))$ to the x axis $(x_1, 0)$, where $x_1$ is the next approximation of r. The equation of the line is:

$$A = [0 - f(x_0)]/[x_1 - x_0] \text{ or}$$

$$x_1 = [Ax_0 - f(x_0)]/A$$

since $f(x_0) = x_0^2 - N$ $$x_1 = [Ax_0 + N - x_0^2]/A$$

Subsequent approximations of r can be obtained by the equation:

$$x_{n+1} = [Ax_n + N - x_n^2]/A \quad (3)$$

In a preferred embodiment $A = 4$. Because 4 is the largest slope of the curve in the region between 0.5 and 2, this assures that the root r is not "overshot" in each successive approximation. By selecting $A = 4$ the binary product of A and $x_n$ in equation "(3)" is accomplished in the present invention by a shifting $x_n$ two places in the direction of the most significant bit. Furthermore, the binary quotient of $[Ax_n + N - x_1^2]$ and A is accomplished in the present invention by shifting the quantity $[Ax_1 + N - x_1^2]$ two places in the direction of its least significant bit.

Figure 3A:
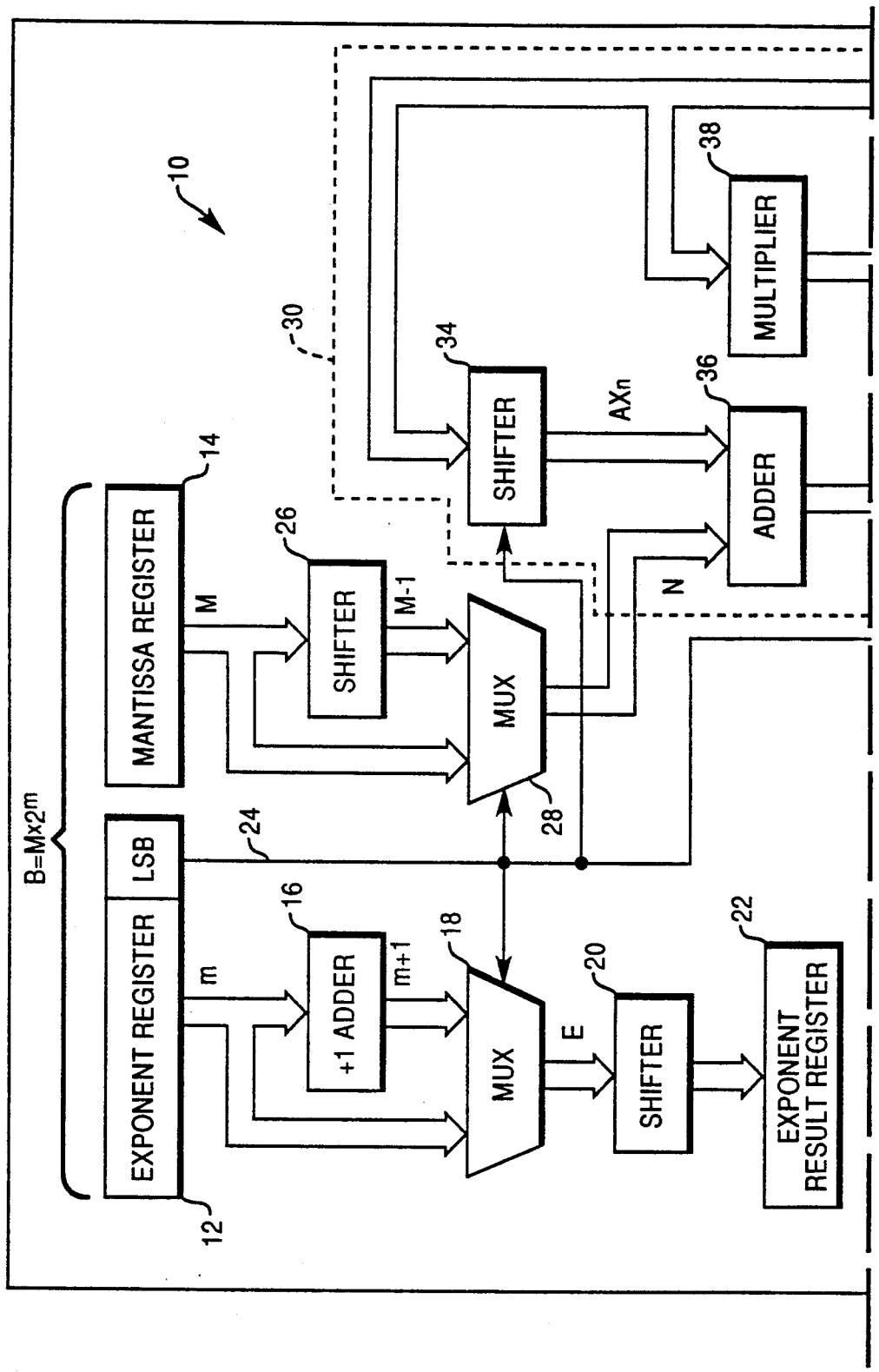
FIGS. 3A and 3B show a block diagram of a device according to one form of the present invention.
Figure 3B:
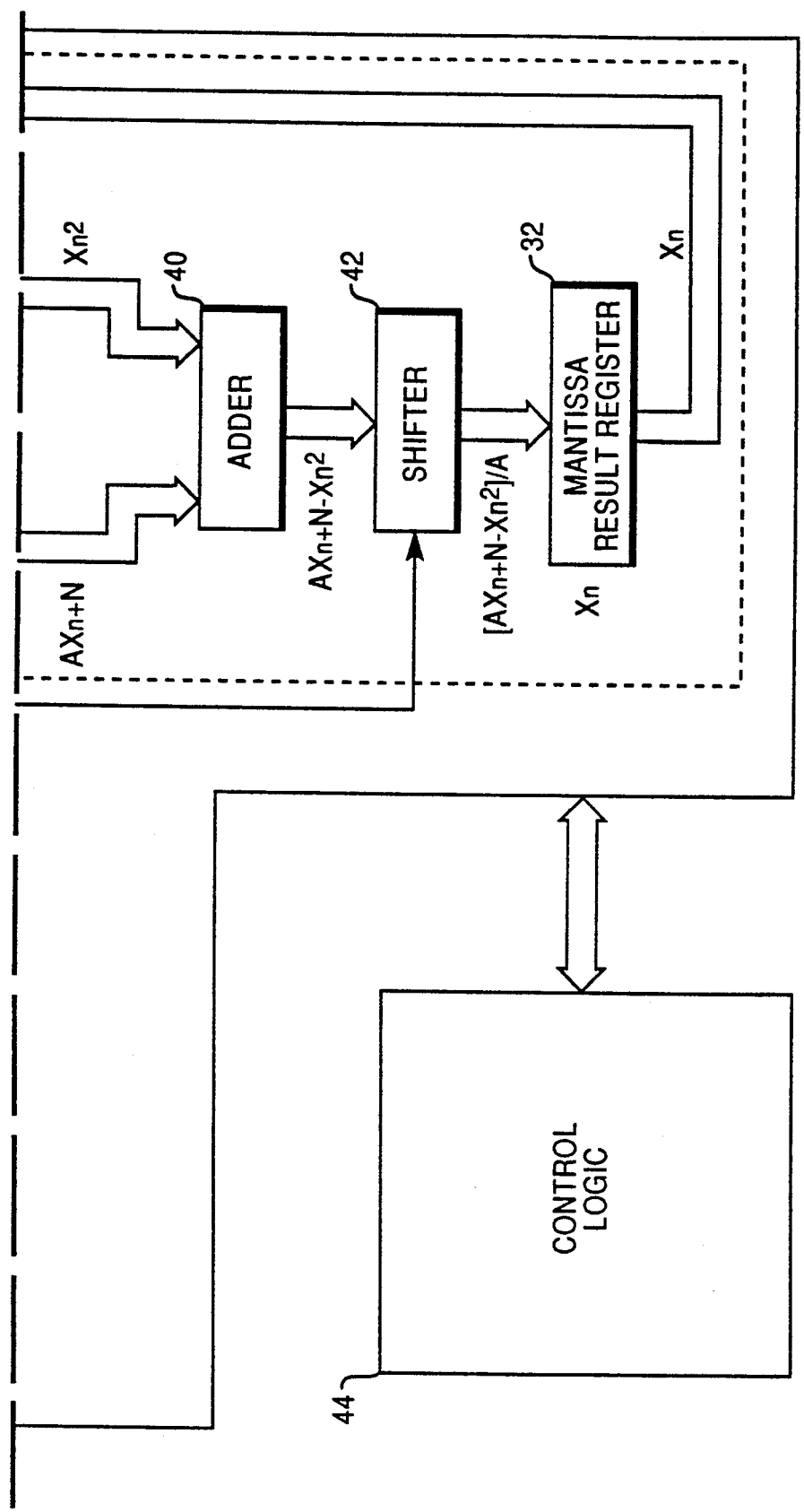

FIGS. 3A and 3B show a block diagram of a device 10 for approximating the square root of a binary number B. Binary number B is expressed in scientific notation by $B = M \times 2^m$, where M is the mantissa of B and m is the exponent of B. M is a normalized value of B between 1 and 2, and m is an integer. Device 10 includes an exponent register 12 for storing m and a mantissa register 14 for storing M.

An adder 16 for adding 1 to m is connected to an output of exponent register 12. A multiplexer 18 is connected to the outputs of exponent register 12 and adder 16 for providing a number E at its output. A shift register 20 is connected between the output of multiplexer 18 and the input of exponent result register 22 for shifting E one place in the direction of its least significant bit.

A control line 24 is connected between the place of the least significant bit (LSB) of exponent register 12 and multiplexer 18. If the value of the LSB is "0", the output (m) of exponent register 12 is selected by multiplexer 18. If the value of the LSB is "1", the output (m+1) of adder 16 is selected by multiplexer 18.

A shift register 26 is connected to the output of mantissa register 14 for shifting mantissa M one place in the direction of its least significant bit. A multiplexer 28 is connected to the outputs of mantissa register 14 and shift register 26 and provides a number N at its output. Control line 24 is connected to multiplexer 28. If the value of the LSB in exponent register 12 is "0", the output (M) of mantissa register 14 is selected by multiplexer 28. If the value of the LSB is "1", the output (M−1) of shift register 26 is selected by multiplexer 28.

Device 10 also comprises apparatus 30 for providing a successive approximation for the square root of the number N provided at the output of multiplexer 28. Apparatus 30 includes a result register 32 for storing $x_n$, where $x_n$ is a successive approximation of r. A shift register 34 is connected to an output of result register 32. Shift register 34 shifts $x_n$ two places in the direction of its most significant bit to form a number $Ax_n$ when $A = 4$. An adder 36 is connected to respective outputs of shift register 34 and multiplexer 28 for adding $Ax_n$ to N, to form a number $Ax_n + N$. A multiplier 38 is connected to the output of result register 32, for multiplying $x_n$ by itself, to form a number $x_n^2$. An adder 40 is connected to outputs of adder 36 and multiplier 38 for subtracting $x_n^2$ from $Ax_n + N$, to form a number $Ax_n + N - x_n^2$. A shift register 42 is connected between the output of adder 40 and the input of result register 32 for shifting the number $Ax_n + N - x_n^2$ two places in the direction of its least significant bit.

Control logic 44 provides timing signals to the various components of device 10. Signals provided by logic 44 determine, among other things, the number of iterations apparatus 30 will incrementally update $x_n$ in result register 32.

The operation of the present invention provides successive approximations for the square root of a binary number B, where B is expressed the product of a binary mantissa M, $1 <= M < 2$, and a binary integer exponent m. Mantissa M is stored in register 14 and exponent m is stored in register 12. Because device 10 is designed to perform the square root operation quickly, the exponent m must be an even number. Thus, if m is odd (LSB of $m = 1$), the exponent m of B is increased by one and its mantissa M is reduced by a power of 2 in shifter 26. Thus, the number N provided to apparatus 30 is a binary number between 0.5 and 2.

As noted previously, the largest slope for the curve $f(x) = x^2 - N$ in the region between 0.5 and 2 is 4. Thus, the value of A is selected to be 4 and shift registers 34 and 42 both provide a two position shift of the respective number input thereto. More specifically, shift register 34 provides a multiply operation by shifting $x_n$ two places in the direction of its most significant bit, and shift register 42 provides a divide operation by shifting $Ax_n + N - x_n^2$ two places in the direction of its least significant bit.

A somewhat faster operation can be achieved by noting that when N is between 0.5 and 1, the maximum slope in the $x_n$ region between 0.5 and 1 is 2. Thus, control logic 44 can provide a signal to shift registers 34 and 42, to only shift the incoming value one place when N is between 0.5 and 1.

Irrespective of whether shift registers 34 and 42 selectively change the number of shift places, apparatus 30 is effective for iteratively replacing $x_n$ with $x_{n+1}$. This replacement occurs in the loop formed by apparatus 30 between the output of register 32 and its input. The value selected for $x_0$, i.e. the first approximation to the square root of N is somewhat arbitrary. In a preferred embodiment, $x_0 = 1$ when $1 <= N < 2$ and $x_0 = 0.5$ when $0.5 <= N < 1$. A satisfactory result should be obtained as long as $0 <= x_0 <= r$. The approximation of r is the product of $x_n$ in result register 32 and the exponent in result register 22.

In a preferred embodiment, the range for N is preselected between 0.5 and 2. By selecting a range for N in which the upper value of the range is four times greater than the lower value of the range, m can always be an even number. This is convenient because the square root of an even power of 2 can be obtained by shifting the decimal point in m one place in the direction of the most significant bit. Alternative ranges for M may be selected between any two binary numbers that differ by a factor of 4. For example, M could be selected between 1 and 4. In this event, adder 16 would subtract 1 and shifter 26 would shift M one place in the direction of its most significant bit. For $1<=N<4$, $A=8$ (the slope at $x=4$).

Figure 4:
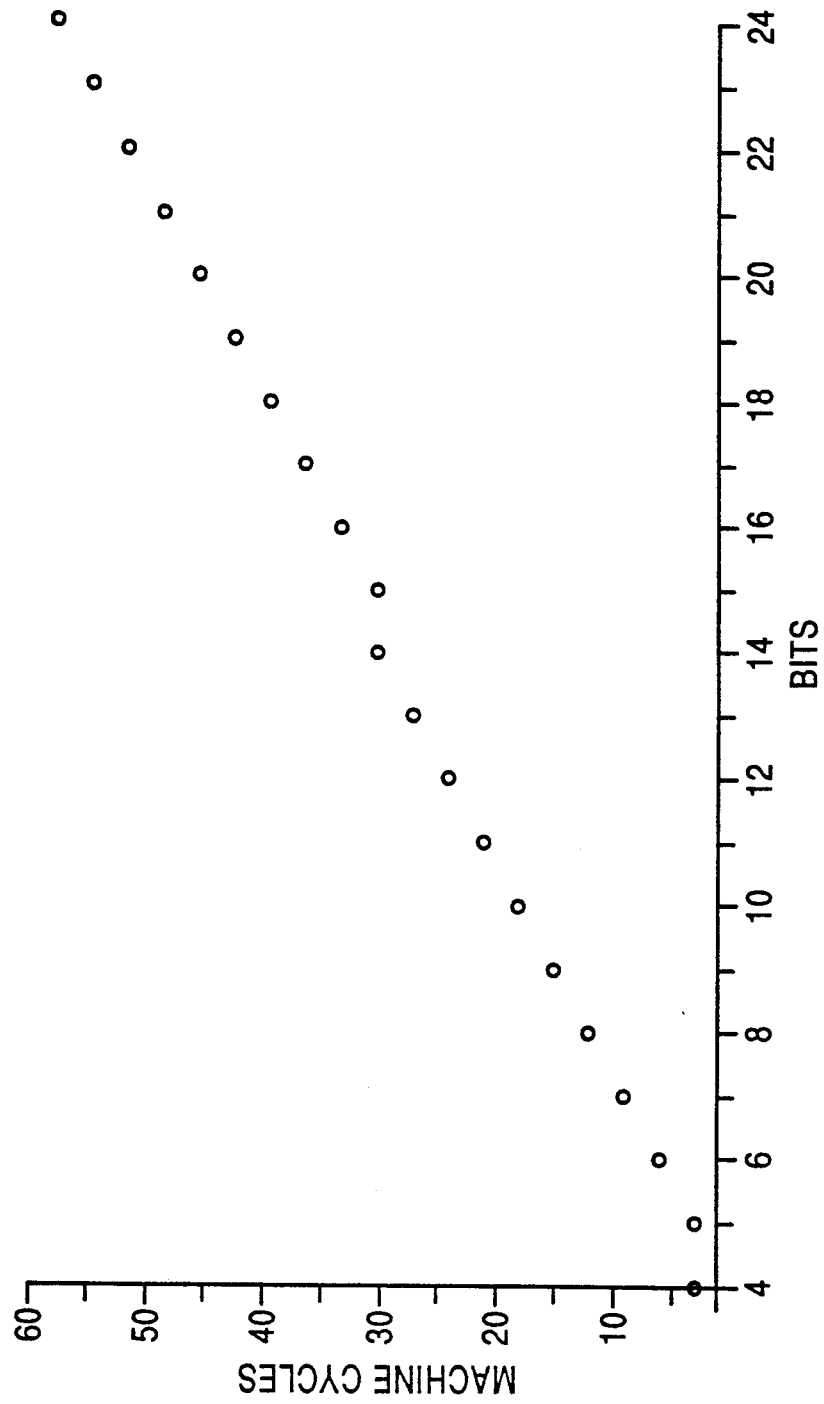
FIG. 4 is a graph of the number of machine cycles required to approximate the square root of a binary number N for different resolutions.

Equation "(3)", $x_{n+1}=[Ax_n+N-x_n^2]/A$, requires only three machine cycles for each iteration. FIG. 4 is a graph of the number of machine cycles required for different degrees of resolution. For example, 12 bit resolution requires 24 machine cycles or 8 iterations. The relationship is basically linear. An advantage of knowing the number of machine cycles for a given resolution includes the ability to preprogram control logic 44 with the number of iterations required of apparatus 30. Furthermore, if device 10 is assigned the task of approximating a square root, the time required will be known in advance.

It will be clear to those skilled in the art that the present invention is not limited to the specific embodiment disclosed and illustrated herein. For example, software and/or firmware embodiments are within the scope of the present invention.

Numerous modifications, variations, and full and partial equivalents can be undertaken without departing from the invention as limited only by the spirit and scope of the appended claims.

What is desired to be secured by Letters Patent of the United States is as follows.

What is claimed is:

1. A device for approximating the square root r of a binary number N comprising:
   a result register for storing $x_n$, where $x_n$ is a successive approximation of r;
   a first shift register connected to an output of said result register for shifting $x_n$ a predetermined number of places in the direction of its most significant bit, to form a number $Ax_n$;
   a first adder connected to an output of said shift register for adding $Ax_n$ to N, to form a number $Ax_n+N$;
   a multiplier connected to the output of said result register, for multiplying $x_n$ by itself, to form a number $x_n^2$;
   a second adder connected to outputs of said multiplier and first adder for subtracting $x_n^2$ from $Ax_n+N$, to form a number $Ax_n+N-x_n^2$; and
   a second shift register connected between an output of said second adder and input of said result register for shifting $Ax_n+N-x_n^2$ a predetermined number of places in the direction of its least significant bit.

2. The device of claim 1 wherein N is between 0.5 and 2.

3. The device of claim 2 wherein said predetermined number of places for said first and second shift registers is 2 when N is between 1 and 2.

4. The device of claim 2 wherein said predetermined number of places for said first and second shift registers is 1 when N is between 0.5 and 1.

5. A device for approximating the square root r of a binary number B, expressed in scientific notation, comprising:
   an exponent register for storing the exponent of B;
   a mantissa register for storing the mantissa of B;
   a first shift register connected to an output of said mantissa register;
   a first multiplexer connected to an output of said shift register and the output of said mantissa register for selectively providing a number N at an output thereof;
   a result register for storing $x_n$, where $x_n$ is a successive approximation of r;
   a second shift register connected to an output of said result register for shifting $x_n$ a predetermined number of places in the direction of its most significant bit, to form a number $Ax_n$;
   a first adder connected to respective outputs of said second shift register and multiplexer for adding $Ax_n$ to N, to form a number $Ax_n+N$;
   a multiplier connected to the output of said result register, for multiplying $x_n$ by itself, to form a number $x_n^2$;
   a second adder connected to outputs of said multiplier and first adder for subtracting $x_n^2$ from $Ax_n+N$, to form a number $Ax_n+N-x_n^2$; and
   a third shift register connected between an output of said second adder and input of said result register for shifting $Ax_n+N-x_n^2$ a predetermined number of places in the direction of its least significant bit.

6. The device of claim 5 further comprising:
   a third adder connected to an output of said exponent register for adding "1" to said exponent;
   a second multiplexer connected to the output of said exponent register and an output of said third adder for selectively providing a number E at an output thereof; and
   a fourth shift register connected to an output of said second multiplexer for shifting E one place in the direction of its least significant bit.

7. The device of claim 6 wherein said first shift register shifts the mantissa of B one place.

8. The device of claim 7 wherein said first shift register shifts the mantissa of B in the direction of its least significant bit.

9. The device of claim 8 further comprising:
   a control line connected between said exponent register and said first and second mutliplexers to provide the least significant bit of the exponent of N as a control signal thereto.

10. The device of claim 9 further comprising:
    an exponent result register for receiving the output of said fourth shift register.

* * * * *